(12) United States Patent
Turunen

(10) Patent No.: US 8,647,475 B2
(45) Date of Patent: Feb. 11, 2014

(54) ROLL COATING ROLL AND METHOD FOR ITS MANUFACTURE

(75) Inventor: Jani Turunen, Lievestuore (FI)

(73) Assignee: Metso Paper, Inc., Helsinki (FI)

( * ) Notice: Subject to any disclaimer, the term of this patent is extended or adjusted under 35 U.S.C. 154(b) by 0 days.

(21) Appl. No.: 13/455,513

(22) Filed: Apr. 25, 2012

(65) Prior Publication Data
US 2013/0105101 A1 May 2, 2013

(30) Foreign Application Priority Data

Apr. 26, 2011 (FI) .................................... 20115400

(51) Int. Cl.
*D21F 3/08* (2006.01)
*B29C 70/32* (2006.01)
*B32B 27/40* (2006.01)
*B32B 27/12* (2006.01)
*B32B 27/04* (2006.01)

(52) U.S. Cl.
USPC ............ 162/358.1; 162/374; 492/20; 492/48; 156/169; 156/187

(58) Field of Classification Search
CPC .................................. D12F 3/086; D12F 3/105
USPC ........ 162/306, 358.1, 358.2, 358.4, 900, 901, 162/374; 156/184, 187, 169; 427/427.5, 427/427.4, 434.6; 492/20, 48
See application file for complete search history.

(56) References Cited

U.S. PATENT DOCUMENTS

| 3,673,025 | A | * | 6/1972 | Fukuyama | 156/154 |
| 3,800,381 | A | * | 4/1974 | Brafford | 492/56 |
| 4,267,299 | A | * | 5/1981 | Oechsle, III | 528/48 |
| 4,571,798 | A | * | 2/1986 | Adams | 492/37 |
| 5,134,010 | A | * | 7/1992 | Schiel | 428/113 |
| 5,994,466 | A | * | 11/1999 | Yang | 525/130 |
| 2003/0096063 | A1 | * | 5/2003 | Withers et al. | 427/425 |
| 2004/0205967 | A1 | * | 10/2004 | Barnes et al. | 29/895.32 |
| 2007/0111871 | A1 | * | 5/2007 | Butterfield et al. | 492/53 |
| 2009/0072443 | A1 | | 3/2009 | Wokurek et al. | |
| 2010/0190624 | A1 | | 7/2010 | Wokurek et al. | |

FOREIGN PATENT DOCUMENTS

DE 102007000505 A1 4/2009

OTHER PUBLICATIONS

Crompton-Uniroyal Chemical, Urethane Prepolymers, Correlation between Durometer (Shore) A and P & J Hardness Scales, Feb. 14, 2001.*
"PPDI for High Performance Polyurethanes (para-phenylene diisocyanate)", Rubber World Magazine, Wayne C. Whelchel (author), Mar. 1, 1992, vol. 205, Issue No. 6, pp. 22-25.
Product description for ADIPRENE L 100.
Product description for ADIPRENE LFP 3940A.
"Correlation between Durometer (Shore) A and P & J Plastometer Hardness Scales" dated Feb. 14, 2001.

* cited by examiner

*Primary Examiner* — Eric Hug
(74) *Attorney, Agent, or Firm* — Stiennon & Stiennon

(57) ABSTRACT

A roll coating is manufactured having fiber and polyurethane made from aromatic isocyanate. The roll coating incorporates fiber having improved strength during the manufacturing stage, and so does not crack, as a result of which the coating can be manufactured in a simple, efficient and inexpensive manner. A roll of a fiber web machine has a roll body having a coating of fiber and polyurethane that is made from aromatic isocyanate, on the roll body.

12 Claims, 1 Drawing Sheet

ROLL COATING ROLL AND METHOD FOR ITS MANUFACTURE

CROSS REFERENCES TO RELATED APPLICATIONS

This application claims priority on Finnish App. No. FI 20115400, filed Apr. 26, 2011, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a roll coating and in particular to a coating which is suitable for rolls used in the production process of a paper web, board web, tissue web, pulp web or other fiber web, and to a method for the manufacture of such coating. The invention also relates to a roll of a fiber web machine, where the roll comprises a coating of a polymeric material on the roll body.

Roll coatings commonly used in the production of paper, board and pulp require a wide range of technical features, such as good dynamic endurance under high load, wear resistance, and properties required by the process or by the fiber web, such as a suitable hardness. Such coatings are typically manufactured from polymers such as polyurethane elastomer. The polyurethane elastomer is typically made from a urethane prepolymer and a chain extender, or a hardening agent, which makes the prepolymer chain become longer by combining long prepolymer chains together, whereby the product becomes viscous, in other words it hardens.

Polyurethane grades based on aromatic isocyanates and especially ones based on PPDI (para-phenylene diisocyanate) are considered as the best raw material basis of present polyurethane roll coatings. They provide excellent heat-resistance and water-resistance and low heat generation, which correlates with the load endurance and cooling need of the coating. Like other polyurethane coatings, PPDI coatings do not usually need cooling, which results in significant energy savings. However, a drawback of the hardest PPDI coatings, with a hardness below 12 P&J (Pusey & Jones) or correspondingly above 96 Shore A, is their poor strength while they are fresh in the manufacturing stage at the moment when the material begins to harden and shrink around the roll. The brittle stage typically lasts for approximately 15 to 60 minutes, after which the chemical hardening reaction has progressed sufficiently far and the material is strong. However, it has been found that the shrinkage of hard PPDI coatings during the brittle stage causes cracking of the coating when the coating is cast around the roll.

FI utility model FI 8255 describes a roll coating which comprises at least one polyurethane elastomer, at least one filler and fibers, and potentially a cord fabric. The publication presents that such a coating has good compression and wear resistance, tearing strength, hardness, and impact strength. According to the publication, the polyurethane preferably contains constituents which include alifatic and/or cycloalifatic isocyanate groups, because these constituents allow an extension to the time between the mixing of the polyurethane pre-stage compounds and the hardening of the mixture. The roll coating can be manufactured by impregnating the cord fabric in the mixture of the polyurethane reaction components or by applying the mixture through a nozzle onto the support fabric, after which the support fabric is wound around the roll.

WO publications 2007/128596 A1 and 2009/033874 A1 describe a roll coating which comprises PPDI-based polyurethane. According to the publication, the strength of the polyurethane while it is fresh is improved and its stress cracking is reduced by adding to the polyurethane a hardening agent which contains 60-99 percent by weight of 1,4-butanediol, a maximum of 40 percent of diamine, and a maximum of 1 percent of catalyst. The hardness of the polyurethane is approx. 80 Shore A-75 Shore D. In the publication, the roll coating is manufactured by the strip casting technique.

A problem in prior art roll coatings is their tendency to generate heat due to the dynamic deformation caused by the roll nip. In most cases, the roll coating being subject to a high load taking place several times per second, the heat generation results in the melting or thermal destruction of the coating if the coating is not cooled from the inside of the roll. Cooling requires suitable equipment to be arranged on the roll and appropriate monitoring of this equipment, which cause extra work. Another disadvantage is that cooling increases the energy consumption of the fiber web.

The very low heat generation and good mechanical properties of roll coatings manufactured from PPDI-based polyurethanes are undisputed. The coatings of press and suction rolls used in paper, board and pulp production have a distinct need for PPDI-based polyurethane roll coatings which have a hardness of below 12 P&J and which can be manufactured in a simple, efficient and economical manner.

SUMMARY OF THE INVENTION

It has now been found unexpectedly that by adding a fibrous filler into the polyurethane, the drawbacks related to the manufacture of hard polyurethane coatings can be avoided, whereby the shrink stresses of the coating can be reduced and its strength while fresh can be improved, which makes it possible to prevent the cracking of the coating during the brittle stage when casting polyurethane onto the roll surface to accomplish the coating.

One aspect of the invention is therefore a roll coating, which comprises fiber and polyurethane that is made from aromatic isocyanate.

The invention is based on the surprising observation that the presence of fiber in the manufacturing stage of a hard polyurethane roll coating improves the strength of the coating while it is fresh in the manufacturing stage, whereby the cracking of the coating in the brittle stage is prevented. Without wishing to be bound by any theory, it can be assumed that the fiber levels out internal stresses in the coating so that the coating cannot crack. Because of the fiber, the liquid polyurethane component mixture remains in a liquid state on the rotating roll shell until the polyurethane begins to harden. The tearing strength of the roll coating also increases as a result of the fiber.

An advantage of the roll coating according to the present invention is that it is hard and does not crack during the brittle stage in the manufacture of the coating. The coating also has improved tearing strength and, depending on the fiber, its electrical conductivity, thermal conductivity and load bearing capacity can also improve. The coating can be manufactured in a simple manner without mold casting equipment, in accordance with the manufacture method of present composite rolls.

Another aspect of the invention is the roll of a fiber web machine, where the roll comprises a roll body, and on top of it a coating made of a polymeric material.

According to the invention, the coating comprises polyurethane and fiber, and its hardness is less than 20 P&J.

Yet another aspect of the invention is a method for the manufacture of the roll coating, where the method comprises the following stages:

the urethane prepolymer and hardening agent, and potentially fiber and/or fillers are mixed together to accomplish the polyurethane mixture, fiber is introduced onto the surface of a rotating roll, the fiber is wetted with the polyurethane mixture to accomplish the coating, if necessary, the coating is heat-treated at a temperature of 80-140° C.

Yet another aspect of the invention is another method for the manufacture of the roll coating, where the method comprises the following stages:

the urethane prepolymer, hardening agent and fiber, and potentially fillers are mixed together to accomplish the polyurethane mixture, the polyurethane mixture is cast as strip casting onto the surface of the rotating roll to accomplish the coating, if necessary, the coating is heat-treated at a temperature of 80-140° C.

DESCRIPTION OF THE PREFERRED EMBODIMENTS

Figure 1:
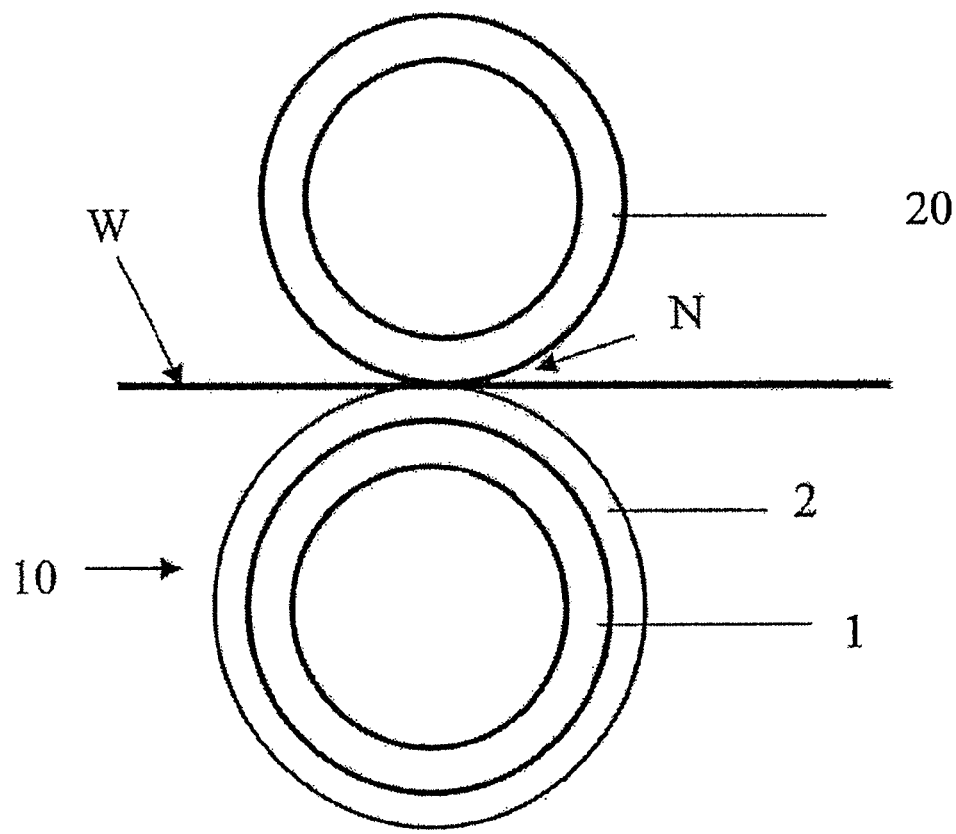
FIG. 1 shows a schematic view of a system where a roll 10 according to the invention and another roll 20 are placed against each other, and a fiber web W runs through the nip located between the rolls.

One aspect of the invention is a roll coating, which comprises fiber and polyurethane that is made from aromatic isocyanate.

Any fibers commonly used in roll coatings can be used in the roll coating according to the invention. The fiber can be organic or inorganic, natural fiber, or synthetic fiber. The fiber can be of polymeric fiber such as polyester, polyamide or aramid, viscose, cotton, hemp, carbon, glass, polyacrylonitrile, boron nitride, metal such as steel, or a mixture of these. The amount of fiber in the roll coating according to the invention is typically 1-40 percent by weight. In one embodiment of the invention, the amount of fiber is 5-25 percent by weight.

The inorganic fiber can be for example metal fiber such as steel fiber, boron fiber, etc., or glass fiber. The organic fiber can be for example carbon fiber, aramid fiber, polyamide fiber, or natural fiber such as flax or hemp.

The fiber can be present in the roll coating as discontinuous, woven or non-woven fabric and/or as roving fiber. The non-woven fiber is typically in the form of non-woven fabric, non-woven felt or non-woven mat. In this invention, the terms fabric, felt and mat refer to any uniform sheet-like or band-like material made from fibers using the non-woven technique. The fabric can be present in the coating in one or more layers. The fiber can be present in the roll coating in several forms, for instance as discontinuous fiber and as carrier fabric, in which case the discontinuous fiber can be added for example to the urethane prepolymer, and the carrier fabric is wound around the roll. The discontinuous fiber can also be introduced into the coating in conjunction with the introduction of a resin mixture, separate from the feed of the resin mixture.

The coating according to the invention can comprise more than one type of fiber. As an example, the continuous fiber or the carrier fiber or carrier fabric can be of the same or different fiber material. The carrier fiber can be for example glass fiber, and the discontinuous fiber can be carbon fiber, aramid fiber, boron fiber, or a mixture of two or more of these. Alternatively, the carrier fiber can be carbon fiber or steel fiber, and the discontinuous fiber can be carbon fiber, steel fiber, aramid fiber, boron fiber, etc. Particularly preferable are fibers with good thermal conductivity, which increase the load-bearing capacity of the coating by leveling out the internal heat generation of the roll coating, thus preventing the creation of local hot spots under extreme load.

In the manufacture of the roll coating, the hardening agent is mixed with the urethane prepolymer to manufacture polyurethane. The selection of the hardening agent can be used to influence the hardening time of the polyurethane and hence the length of the brittle stage. Due to the fiber, the internal shrinkage stresses within the roll coating are extended beyond the brittle stage, and the cracking of the coating is prevented. The strength of the roll coating also increases as a result of the fiber. In the present invention, the brittle stage refers to the time interval during which the polyurethane is in a glasslike or waxlike state after gelation, i.e. hardening of the liquid polyurethane, and exposed to the cracking of the material caused by internal stresses, shrinkage stresses caused by cooling, or small external impacts. The length of the brittle stage depends on the urethane system used. The brittle stage typically lasts for 10-60 min.

The roll coating according to the invention can also contain one or more fillers. The filler can be, but not limited to, an inorganic metallic, ceramic or mineral filler, such as silicon dioxide, silicon carbide, aluminum oxide, boride, titanium dioxide, zirconium dioxide, silicate, chalk, carbon black, or boron nitride, and the filler can be in different particle forms such as powder, spheroids, beads, fibers, sheets, etc. The filler can also be organic, such as a synthetic polymer like UHM-WPE (ultra-high molecular weight polyethylene), synthetic fiber like an aliphatic or aromatic polyamide, or a carbon nanotube, and the filler can be in the form of discontinuous fiber, fiber chips, or powder. The amount of filler in the roll coating can typically be 0.01-50 percent by weight. The size of filler can vary from nano size to 200 μm.

The polyurethane used in the roll coating according to the invention is manufactured in a manner known per se. The polyurethane can be either pourable or extruded polyurethane. Prepolymerization techniques known in the art can be used in the manufacture of the polyurethane, in which case the prepolymerization can be performed either partially (quasi-prepolymer method) or completely (full prepolymer method). The invention can also employ low free monomer prepolymers, which contain very little free isocyanate (<0.1%).

In the present invention, the component which contains isocyanate groups, used in the manufacture of the prepolymer, is selected from among aromatic isocyanate compounds. Polyurethanes based on aromatic isocyanates have been found to have good technical characteristics in roll coating applications. The isocyanate can be, but not limited to, 2,4- or 2,6-toluene diisocyanate (TDI), 4,4'-, 2,4'-, 2,2'-methylene diphenyl diisocyanate (MDI), 1,5-naphthalene diisocyanate (NDI), para-phenylene diisocyanate (PPDI), 3,3'-dimethyl-4,4'-biphenylene diisocyanate (TODI), 1,4-benzene diisocyanate, 1,3- or 4,6-xylylene diisocyanate (XDI), or tetramethyl xylylene diisocyanate (TMXDI). In one embodiment of the invention, the isocyanate compound is PPDI.

The hardening agent used in the manufacture of polyurethane can be any commonly used polyol-type, diol-type and/or diamine-type compound, which falls within the scope of knowledge of a person having ordinary skill in the art. Alongside the term hardening agent, the term chain extender is also commonly used in the art. The hardening agent, or chain extender, causes the prepolymer chain to become longer by combining long prepolymer chains together. The hardening agent can be selected from the following, but not limited to these: alifatic and aromatic diols and triols, alifatic and aromatic, primary and secondary diamines and triamines. The hardening agent can also comprise more than one hardening agent. In one embodiment of the invention, the hardening agent is 1,4-butanediol. In view of the winding manufacturing method of the roll coating, 1,4-butanediol accomplishes a long hardening time and good properties in the final product.

The urethane prepolymer and the hardening agent are mixed at a molar ratio of XH/NCO=0.85 to 1.0, where XH refers to the group containing active hydrogen. In one embodiment of the invention, the molar ratio is 0.90.

In one embodiment of the invention, the hardness of the roll coating is less than 12 P&J (Pusey&Jones) as measured according to standard ASTM D531. In another embodiment of the invention, the hardness is about 7 P&J. The hardness can be adjusted to conform to the particular purpose of the roll coating.

The thickness of the coating on the roll is typically about 20 mm. The coating can be machined by grinding to a desired roughness, the coating can be drilled to make through-holes or blind holes, and/or the coating can be grooved.

Another aspect of the invention is the roll 10 of a fiber web machine, where the roll comprises a roll body 1, and on top of it a coating 2 made of a polymeric material. According to the invention, the coating comprises polyurethane and fiber, and its hardness is less than 20 P&J. In another embodiment of the invention, the hardness is less than 12 P&J. In yet another embodiment of the invention, the hardness is about 7 P&J.

FIG. 1 shows a schematic view of an installation where a fiber web W runs through a nip N located between two rolls 10, 20. The roll 10 comprises a roll body 1, and on top of it a coating 2 made of a polymeric material. The body is typically made of metal such as cast iron or steel. The coating 2 according to the invention comprises polyurethane and fiber. The roll can be the roll of a coating device, in which case the web W to be coated is in direct contact with the surfaces of the rolls 10, 20. In this case, the coating 2 is smooth. The roll can also be a suction or vacuum roll, in which case a negative pressure prevails inside the roll, and the roll shell 1 is perforated in order to take the suction effect to the web W, which runs into the nip supported by a fabric or fabrics (not shown). Naturally, in this case the coating is also perforated like the roll shell. The roll can also be a press roll, which intends to remove water from the web and to increase its dry solids content. In this case, too, the web W is brought into the nip N supported by a fabric on one side or on both sides. The coating is preferably provided with recesses such as blind holes and/or grooves so that the water removal capacity from the nip increases. The grooves extend in the circumferential direction of the coating, their width is 0.3-15 mm, depth 0.5-50 mm, and the distance between the grooves is typically 1-200 mm. An as high hardness of the coating as possible is a desirable feature so that the grooves retain their shape without collapsing under a high load in the press nip, and are thus able to receive and carry away the water volume squeezed from the web while the roll is rotating.

The roll coating according to the invention can be manufactured using the mold casting or strip casting technique commonly used in the manufacture of polyurethane coatings. In mold casting, the raw material components of polyurethane, in other words the urethane prepolymer and the diol hardener or amine hardener, and potential auxiliary ingredients are mixed at the casting end and led into a mold assembled around the roll body. The fibers are inserted in the coating either by introducing them onto the roll body before the roll body is placed in the casting device or, in the case of discontinuous fibers, with the resin mixture. The raw material components are selected so that their mixture remains in a liquid state for a sufficiently long time so that the mixture has time to spread evenly in the mold. The hardened coating is post-treated by heating it in an oven.

In strip casting, the raw materials are mixed in a mixing chamber, and the mixture is cast immediately after this from a nozzle as strip casting onto the rotating roll body. The nozzle moves from one end of the roll to the other, and the coating can be constructed with one or more passes to correspondingly give one or more layers. If necessary, the coating is heat-treated at a temperature of 80-140° C. The raw materials in strip casting are selected so that the viscosity of the raw material mixture increases in a sufficiently short period of time so that the coating can be cast as a coating onto a rotating roll and so that the mixture does not drip off the roll. The raw materials can include rapidly reacting amines as a hardening agent, and catalysts. The fiber material can be introduced onto the roll body by winding or wrapping before or during casting, preferably synchronised with the movement of the casting head. In the case of discontinuous fiber, the fiber can be mixed into one of the raw materials in advance and/or introduced to the material during the casting stage.

An economical and efficient method for the manufacture of the roll coating according to the invention is a method which is currently used for the manufacture of fiber-reinforced epoxy coatings, or so-called composite roll coatings. Composite roll coatings contain a fibrous reinforcement such as non-woven fiber fabric, and they are usually based on slowly-reacting epoxy resins. The resin, hardening agent and necessary auxiliary ingredients are mixed together, and the resulting mixture is led into a nozzle or wetting basin. The fiber fabric is wound around a rotating roll and wetted through the nozzles to the top side of the roll, or the fiber fabric is first wetted in the basin and/or by means of the nozzles, and then wound onto the rotating roll. In this way, coatings according to the invention can be manufactured even from polyurethane grades which are very susceptible to cracking and which react slowly.

Figure 2:
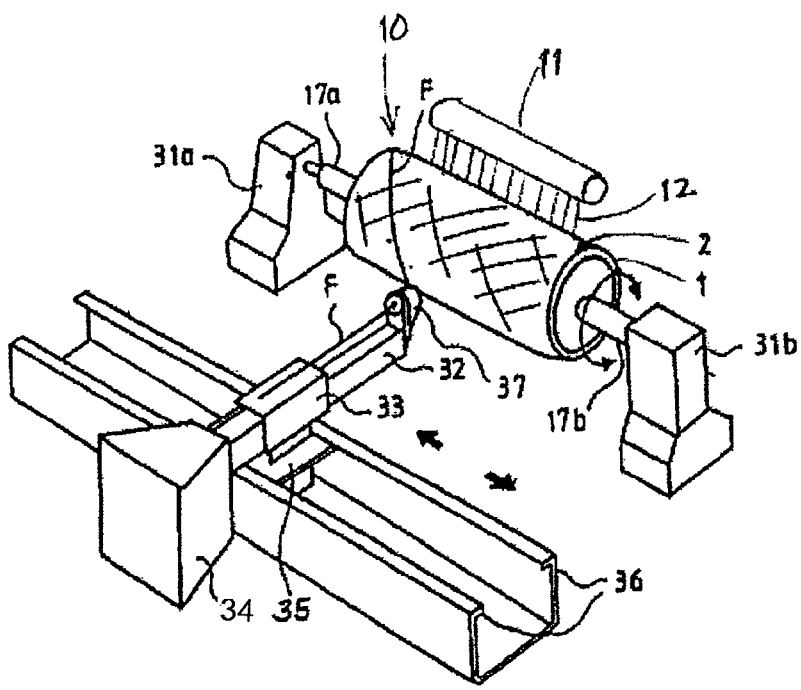
FIG. 2 shows an embodiment of the method according to the invention for the manufacture of the roll coating.

FIG. 2 shows one method of manufacture for the roll coating 2 according to the invention. The roll body 1 is placed on bearing pedestals 31a, 31b supported by shaft journals 17a, 17b so that the roll body 1 can rotate. When the roll 10 rotates, the fiber material F is introduced onto the roll body 1 in a band-like form using a device which comprises a fiber feed device 34, guide 33, and feed head 37 supported on the transverse beam 32. The transverse beam is supported on a carriage 35, which can be moved in the axial direction of the roll in the guideway 36. The angle of winding of the fiber can be changed by adjusting the position of the feed head 37 and the velocity of the carriage 35. Concurrently with the winding of the fiber F, the fiber on the surface of the roll is wetted with the resin compound 12 through the nozzle device 11, into which the components of the polyurethane resin have been led and where they are brought together just before they come out of the nozzle device 11. In the same conjunction, fillers can be added to the resin mixture, for example mixed with some component of polyurethane. The resin mixture 12 can be drained through the outlet gap, gaps or holes of the nozzle device 11 or through separate nozzles under gravity, or there can be a positive pressure inside the nozzle device 11, in which case the resin mixture is injected/sprayed onto the fiber material. The nozzle device 11 can be as wide as the roll, or it can be shorter than the roll, in which case the nozzle device 11 can be moved in the axial direction of the roll. The operation of the device 11 is preferably synchronized with the movement of the feed head 37. The nozzle device can be located in the vicinity of the feed head 37 and wet the fiber material F just before the fiber material is brought into contact with the surface of the roll body, or at the same time as the fiber material comes into contact with the surface of the roll body, or immediately after the fiber has come into contact with the surface of the roll body.

One aspect of the invention is hence a method for the manufacture of the roll coating, where the method comprises the following stages:

the urethane prepolymer and hardening agent, and potentially fiber and/or fillers are mixed together to accomplish the polyurethane mixture, fiber is introduced onto the surface of a rotating roll, the fiber is wetted with the polyurethane mixture to accomplish the coating, if necessary, the coating is heat-treated at a temperature of 80-140° C.

In one embodiment of the invention, the fiber is introduced onto the roll in the form of non-woven fabric, preferably as a narrow band by winding. The fiber fabric can be introduced onto the roll while the fiber fabric is dry, and it can be wetted with polyurethane through nozzles while being wound onto the roll. The fiber fabric can also be wetted separately either through nozzles or in a basin before being wound onto the roll.

Yet another aspect of the invention is a method for the manufacture of the roll coating, where the method comprises the following stages:

urethane prepolymer, hardening agent and fiber, and potentially fillers are mixed together to accomplish a polyurethane mixture, the polyurethane mixture is cast as strip casting onto the surface of a rotating roll to accomplish the coating, if necessary, the coating is heat-treated at a temperature of 80-140° C.

In one embodiment of the invention, the fiber is mixed into the prepolymer or hardening agent. The fiber can also be introduced into the coating during the casting stage.

The following examples illustrate the invention, however, without limiting the invention thereto.

Example 1

A roll with polyurethane coating was manufactured by winding a non-woven fiber mat made of stainless steel onto a metal cylinder having a length of 20 cm and a diameter of 20 cm, and at the same time by wetting it with slowly-reacting PPDI urethane. The thickness of the coating was 19 mm. The polyurethane was made from PPDI prepolymer (Adiprene LFP590D, manufacturer Chemtura Corp.) and 1,4-butanediol at a molar ratio of XH/NCO=0.90. The solidification time of the mixture was about 4 minutes. After winding, the roll was heated with an infrared heater and hardened finally at 130° C. for 24 hours. The coating did not crack after winding or during final hardening. A reference coating was manufactured as described above but without fiber, with the same PPDI urethane cast as mold casting around a metal cylinder with a diameter of 20 cm over a thickness of 20 mm. The coating cracked during the brittle stage while the coating was in the oven in final hardening. The example shows that the fiber both improves the strength of PPDI polyurethane while it is fresh so that it does not crack during the brittle stage in the manufacture of the coating, and the fiber also enables the manufacture of the roll coating in a simple manner using the winding technique.

Example 2

Properties of 7 P&J PPDI polyurethane were determined with various fibers and without fiber. The results obtained are shown in Table 1.

TABLE 1

| Fiber | Tangent delta at 80° C. | Wear loss (mm$^3$, DIN53516) | Tearing strength (N/mm, ISO34-1) |
|---|---|---|---|
| no fiber | 0.021 | 24 | 96 |
| aramid | 0.022 | 33 | 146 |
| carbon fiber | 0.027 | 42 | 121 |
| stainless steel | 0.023 | 35 | 128 |
| glass fiber | 0.019 | 57 | 164 |

The results in the table show that the fiber increases significantly the tearing strength of polyurethane and hence its disturbance endurance without essentially changing the wear of the coating or the internal heat generation value in deformation.

For a person having ordinary skill in the art, it is obvious that as technology makes further progress, the basic idea of the invention can be implemented in many different ways. The invention and its embodiments are therefore not restricted to the examples described above, but they may vary within the appended claims.

I claim:

1. A roll of a fiber web machine, wherein the roll comprises:
    a roll body:
    a roll coating on top of the roll body wherein the hardness of coating on the roll body is less than 12 P&J;
    wherein the roll coating comprises para-phenylene diisocyanate (PPDI) based polyurethane applied to fibers and wetted by the polyurethane so as to form a 5-25 percent by weight fiber reinforcing throughout the para-phenylene diisocyanate (PPDI) based polyurethane so as to prevent cracking of the urethane during formation of the roll coating.

2. The roll of claim 1 wherein the para-phenylene diisocyanate (PPDI) based polyurethane is applied to the fibers which are circumferentially wound about the roll body and wetted by the polyurethane.

3. The roll of claim 1 wherein the coating of the 5-25 percent by weight fiber reinforcing of the para-phenylene diisocyanate (PPDI) based polyurethane is about 20 mm thick.

4. The roll of claim 1 wherein the hardness of the roll coating is about 7 P&J.

5. The roll of claim 1 wherein the polyurethane has a hardening agent which is 1,4-butanediol.

6. The roll of claim 1 wherein the roll coating has a surface, and portions forming circumferential grooves in the surface.

7. The roll of claim 6 wherein the width of the grooves is 0.5-15 mm and the depth of the grooves is 0.5-50 mm.

8. A method for the manufacture of a roll with a coating, the method comprising the steps of:

mixing para-phenylene diisocyanate and a hardening agent 1,4-butanediol together to form a para-phenylene diisocyanate (PPDI) based polyurethane mixture; and circumferentially winding fibers about a roll body onto the surface of the rotating roll body and wetting the fibers with the para-phenylene diisocyanate (PPDI) based polyurethane before or after the fibers are wound on to the roll body to form a roll coating comprising 5-25 percent by weight fiber reinforcing throughout the para-phenylene diisocyanate (PPDI) based polyurethane; and heat-treating the roll coating at a temperature of 80-140° C. to form the roll coating with a hardness on the roll body of less than 12 P&J while the 5-25 percent by weight fiber reinforcing throughout the para-phenylene diisocyanate (PPDI) based polyurethane prevents cracking of the roll cover while the para-phenylene diisocyanate (PPDI) based polyurethane transitions through a brittle stage while the coating hardens on the roll body to less than 12 P&J.

9. The method of claim 8 wherein para-phenylene diisocyanate and the hardening agent are mixed at a molar ratio of XH/NCO=0.85-1, where XH=a group containing active hydrogen.

10. The method of claim 9, wherein the fibers are in the form of a fabric are wound onto the roll body as a band and the polyurethane mixture is applied to the fiber fabric during said winding.

11. The method of claim 10 wherein the fiber fabric is immersed in the polyurethane mixture before being wound onto the rotating roll body.

12. The method of claim 8 wherein the step of circumferentially winding and wetting the fibers forms a roll cover of about 20 mm, and a hardness after heat treatment of about 7 P&J.

* * * * *

UNITED STATES PATENT AND TRADEMARK OFFICE
CERTIFICATE OF CORRECTION

| | |
|---|---|
| PATENT NO. | : 8,647,475 B2 |
| APPLICATION NO. | : 13/455513 |
| DATED | : February 11, 2014 |
| INVENTOR(S) | : Jani Turunen |

It is certified that error appears in the above-identified patent and that said Letters Patent is hereby corrected as shown below:

Title page, Item (73) assignee should be changed from Metso Paper, Inc. to Valmet Technologies, Inc.

Signed and Sealed this
Eighteenth Day of March, 2014

Michelle K. Lee
*Deputy Director of the United States Patent and Trademark Office*